United States Patent [19]
Lentz

[11] Patent Number: 5,834,692
[45] Date of Patent: Nov. 10, 1998

[54] UNIVERSAL AIR-VAPOR BARRIER BOX

[75] Inventor: Stephen K. Lentz, Campbellsport, Wis.

[73] Assignee: Low Energy Systems Supply Company, LLC, Campbellsport, Wis.

[21] Appl. No.: 882,898

[22] Filed: Jun. 26, 1997

[51] Int. Cl.$^6$ .................................................. H02G 3/08
[52] U.S. Cl. ........................... 174/57; 220/3.94; 220/4.02
[58] Field of Search .................................. 174/50, 53, 57, 174/58; 248/906; 220/3.3, 3.5, 3.7, 3.92, 3.94, 4.02

[56] References Cited

U.S. PATENT DOCUMENTS

| | | | |
|---|---|---|---|
| 3,584,136 | 6/1971 | Robert | 220/3.94 X |
| 3,873,759 | 3/1975 | Schindler et al. | 220/3.3 X |
| 3,970,772 | 7/1976 | Ballard | 174/53 |
| 4,202,457 | 5/1980 | Tansi | 220/3.3 |
| 4,757,158 | 7/1988 | Lentz | 174/53 |
| 4,794,207 | 12/1988 | Norberg et al. | 174/53 X |
| 5,066,832 | 11/1991 | Clarey et al. | 174/50 |
| 5,274,194 | 12/1993 | Belcher | 174/50 |
| 5,555,989 | 9/1996 | Moran, Jr. | 220/3.94 X |

*Primary Examiner*—Dean A. Reichard
*Attorney, Agent, or Firm*—Donald Cayen

[57] ABSTRACT

A universal air-vapor barrier box for electrical outlet boxes is convertible between a fixed mode and a foldable mode. The barrier box is manufactured in the fixed mode with top, bottom, side, and back walls and top, bottom, and side flanges. The back wall has a groove that extends between the top and bottom walls. Grooves in the top and bottom walls are aligned with and continuous with similar grooves in the top and bottom flanges. In the fixed mode all the walls and flanges are unitary members. The barrier box receives an electrical outlet box, and the two are nailed together to a building stud or rafter. With many electrical outlet boxes, there is sufficient room within the barrier box when it is in the fixed mode to swing a hammer and drive the nails. With large electrical outlet boxes, the grooves in the top and bottom walls and flanges are cut through to place the barrier box in the foldable mode. The barrier box is bent about the groove in the back wall to thereby provide increased space for nailing the electrical outlet box. After nailing, the barrier box is bent back and sealed.

20 Claims, 5 Drawing Sheets

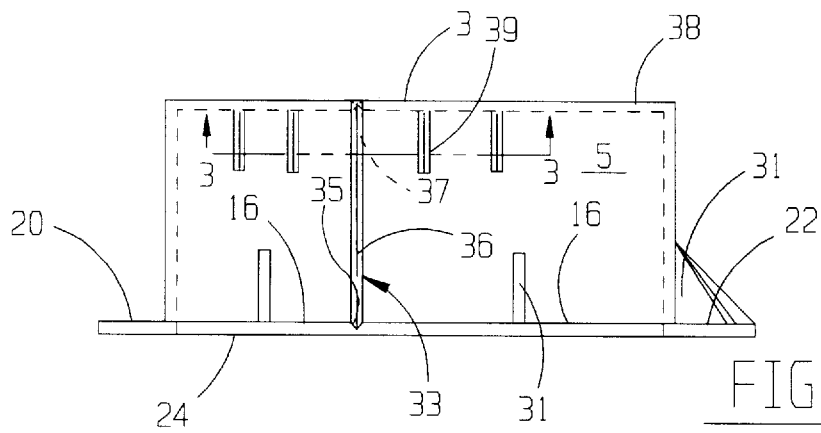
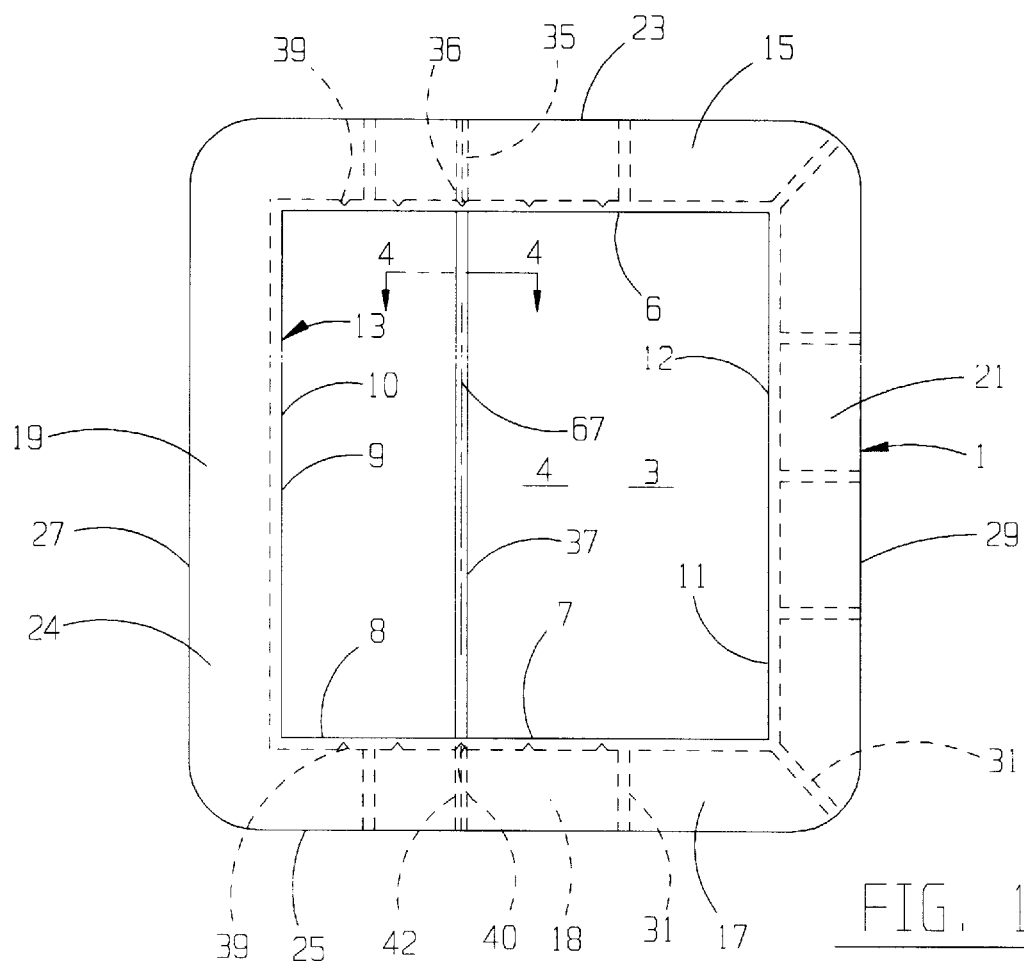
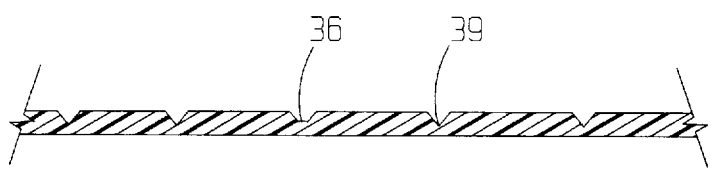
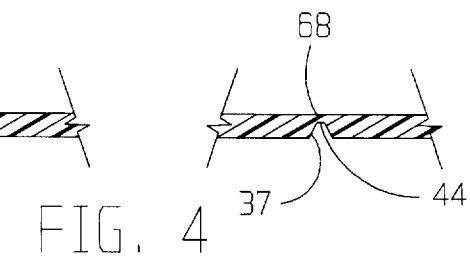

UNIVERSAL AIR-VAPOR BARRIER BOX

BACKGROUND OF THE INVENTION

This invention pertains to heat transfer, and more particularly to apparatus for inhibiting the flow of heated and/or cooled air through building walls.

DESCRIPTION OF THE PRIOR ART

It is well known that a significant amount of air is able to pass through electrical outlet boxes in buildings. Consequently, heated or cooled air inside a building is lost when the air flows through the electrical outlet boxes installed on outside walls of the building.

To prevent air flow through electrical outlet boxes, it is known to use air impermeable covers and similar products in conjunction with the electrical outlet boxes. U.S. Pat. Nos. 3,684,819; 4,296,870; 4,626,617; 4,673,097; 4,757,158; and 4,952,754 show various products that inhibit flow of air through electrical outlet boxes. The products of the foregoing patents are fixed in size and shape. The prior products are sufficiently large to accommodate most electrical outlet boxes without problem. However, in some applications, particularly when used with ceiling electrical outlet boxes, it is difficult to install the outlet boxes using the products of the foregoing patents.

My co-pending U.S. patent application Ser. No. 08/752,065 describes an air barrier box that is foldable along a back wall. The foldability of the barrier box renders it particularly suitable for use with ceiling electrical outlet boxes, where space limitations make it difficult to use a fixed air barrier product. The air barrier box of patent application Ser. No. 08/752,065 is thus an improvement over prior fixed air-vapor barrier boxes.

Many building contractors prefer to use fixed air-vapor barrier boxes wherever possible. Use of folding barrier boxes is limited to situations where installation clearances make it difficult to use a fixed barrier box. Nevertheless, the contractor must maintain an inventory of both fixed and foldable barrier boxes. That practice is undesirably inefficient and expensive.

Accordingly, further advancements in air sealing products for use with electrical outlet boxes are highly desirable.

SUMMARY OF THE INVENTION

In accordance with the present invention, a universal air-vapor barrier box is provided that is suitable for use with all electrical outlet boxes throughout a building. This is accomplished by enabling an electrician to convert the barrier box from a fixed mode to a foldable mode.

The universal air-vapor barrier box is manufactured with a back wall, opposed top and bottom walls, and opposed first and second side walls. The five walls define a container section large enough to hold all commonly used conventional building wall and ceiling electrical outlet boxes. Respective co-planar flanges project perpendicularly outwardly from the top, bottom, and side walls. The flanges terminate in respective free edges. The flanges may be reinforced with gussets.

The back wall is formed with a shallow and narrow groove that extends between the top and bottom walls. The groove may be generally V-shaped. It preferably is on the inside surface of the back wall. The groove in the back wall aligns with similar grooves in the top and bottom walls. In turn, the grooves in the top and bottom walls meet and continue into grooves in the top and bottom flanges. The grooves in the top and bottom walls are preferably on the outside surfaces of those walls. The grooves in the top and bottom flanges are preferably on the flanges' front surfaces. The aligned grooves thus extend in a single plane from the free edge of the bottom flange to the free edge of the top flange. As manufactured, the universal air-vapor barrier box is in a fixed mode in which each of the top and bottom walls and top and bottom flanges is a unitary member. The grooves do not materially affect the structural integrity of the barrier box.

To use the universal air-vapor barrier box with an electrical outlet box normally used in building side walls, the outside edge of the first side wall of the barrier box is placed against a building wall member, such as a vertical stud. The electrical outlet box is placed against the inside of the barrier box first side wall. The electrical outlet box and the barrier box are mounted simultaneously to the stud by nails and a hammer in well known manner. The size of the barrier box container section is sufficient to accommodate both the electrical outlet box and the space necessary to swing the hammer. After the electrical outlet box has been wired, a moisture barrier film is laid over the building wall and the barrier box. An opening is cut in the film slightly larger than the size of the container section. The film is taped around the opening to the barrier box flanges.

The universal air-vapor barrier box is used in a different manner with ceiling electrical outlet boxes, which are usually larger than those used on building side walls. To suit ceiling electrical outlet boxes, the electrician cuts through the grooves in the top and bottom flanges and top and bottom walls of the barrier box. Doing so converts the barrier box into a foldable mode and enables the barrier box to bend along the groove in the back wall. Bending the barrier box along the back wall opens up the container section and provides ample space to swing a hammer to mount the barrier box and electrical outlet box to a selected ceiling member. When wiring of the ceiling electrical outlet box is completed, the barrier box is bent back such that the flanges are all coplanar again. The joints at the cuts in the top and bottom walls and top and bottom flanges are covered with a suitable tape. Later, a moisture barrier film is cut and taped to the flanges in the same way as with the electrical outlet boxes used in the side walls.

The apparatus and method of the invention, using aligned shallow grooves extending between the free edges of the top and bottom flanges, thus provide convenient installation of electrical outlet boxes for both side walls and ceilings of a building. The grooves in the universal air-vapor barrier box do not detract from its structural integrity when it is in the fixed mode, even though the grooves enable quick and accurate cutting for converting the barrier box into the foldable mode.

Other advantages, benefits, and features of the present invention will become apparent to those skilled in the art upon reading the detailed description of the invention.

BRIEF DESCRIPTION OF THE DRAWINGS

FIG. 1 is a front view of the universal air-vapor barrier box of the invention.

FIG. 2 is a top view of FIG. 1.

FIG. 3 is a cross sectional view on an enlarged scale taken along line 3—3 of FIG. 2.

FIG. 4 is a cross sectional view on an enlarged scale taken along line 4—4 of FIG. 1.

DETAILED DESCRIPTION OF THE PREFERRED EMBODIMENT

Figure 6:
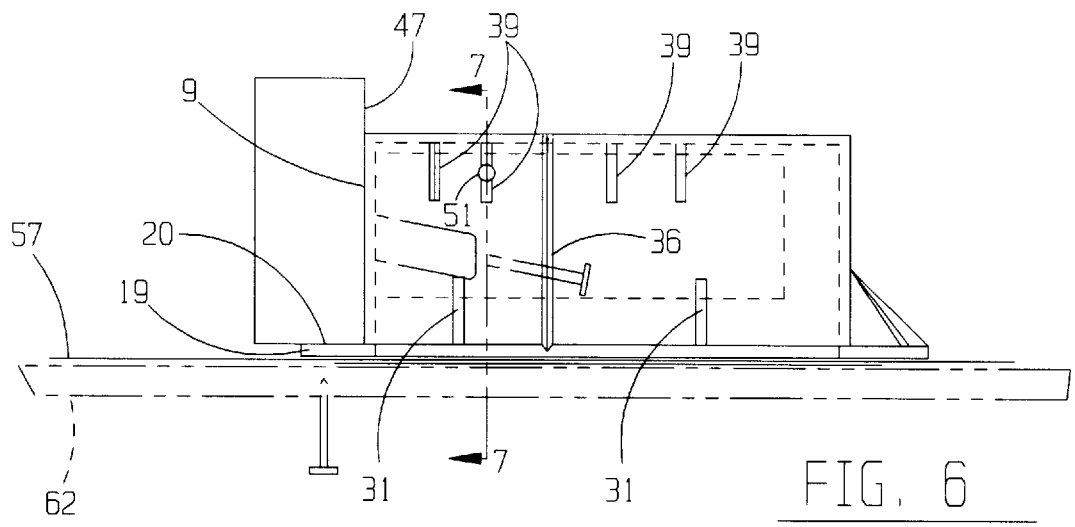
FIG. 6 is a top view of FIG. 5.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1–4, a universal air-vapor barrier box 1 is illustrated that includes the present invention. The universal air-vapor barrier box 1 is useful in conjunction with conventional electrical outlet boxes in building walls and ceilings to prevent air flow past the electrical outlet boxes.

The universal air-vapor barrier box 1 is comprised of a back wall 3, top wall 5, bottom wall 7, first side wall 9, and second side wall 11. The inside surfaces 4, 6, 8, 10, and 12 of the back, top, bottom, and side walls, respectively, define a five-sided container section 13. The container section 13 is large enough to surround electrical outlet boxes typically used in residential and commercial construction. Satisfactory dimensions for the container section are 7.50 inches long, 6.50 inches wide, and 3.13 inches deep.

Projecting outwardly from the top, bottom, and side walls of the universal air-vapor barrier box 1 are respective flanges 15, 17, 19, and 21. The flanges 15, 17, 19, and 21 have respective back surfaces 16, 18, 20, and 22. The front surfaces 24 of the flanges all lie in a common plane that is perpendicular to their respective walls 5, 7, 9, and 11. The flanges terminate in respective free edges 23, 25, 27, and 29. The flanges 15, 17, and 21 are reinforced with gussets 31. The universal air-vapor barrier box 1 is preferably molded as a single piece from a low density polyethylene thermoplastic material. A thickness of approximately 0.07 inches for the walls, flanges, and gussets is satisfactory.

In accordance with the present invention, aligned grooves extend from the free edge 23 of the top flange 15 to the free edge 25 of the bottom flange 17. In the construction illustrated in FIGS. 1–4, a first groove 35 extends along the back surface 16 of the top flange from the free edge thereof to the top wall 5. The groove 35 continues into a second groove 36 along the outside surface of the top wall as far as the back wall 3. There is a groove 37 along the inside surface 4 of the back wall between the top wall and the bottom wall 7. The groove 37 is aligned with the groove 36. A groove 40 in the outside surface of the bottom wall is aligned with the groove 37. A groove 42 in the back surface 18 of the bottom flange is aligned with and continues into the groove 40.

The grooves 35, 36, 40, and 42 are preferably V-shaped. A width of approximately 0.02 inches to 0.03 inches and a depth of approximately 0.010 inches to 0.015 inches are satisfactory. The groove 37 is generally V-shaped, but it has a flat root 44. The maximum width of the groove 37 is preferably approximately 0.12 to 0.15 inches, with the root 44 being approximately 0.01 inches wide. A depth for the groove 37 of approximately 0.04 inches to 0.055 inches works very well.

There are some short grooves 39 in the outside surfaces of the top and bottom walls 5 and 7, respectively. Four grooves 39 are shown in both walls, with two grooves on each side of the grooves 36 and 40. However, more or fewer grooves 39 can be used, and they can have different locations relative to the grooves 36 and 40, if desired. The grooves 39 may be approximately one inch long and have the same size and shape as the grooves 36 and 40.

Figure 5:
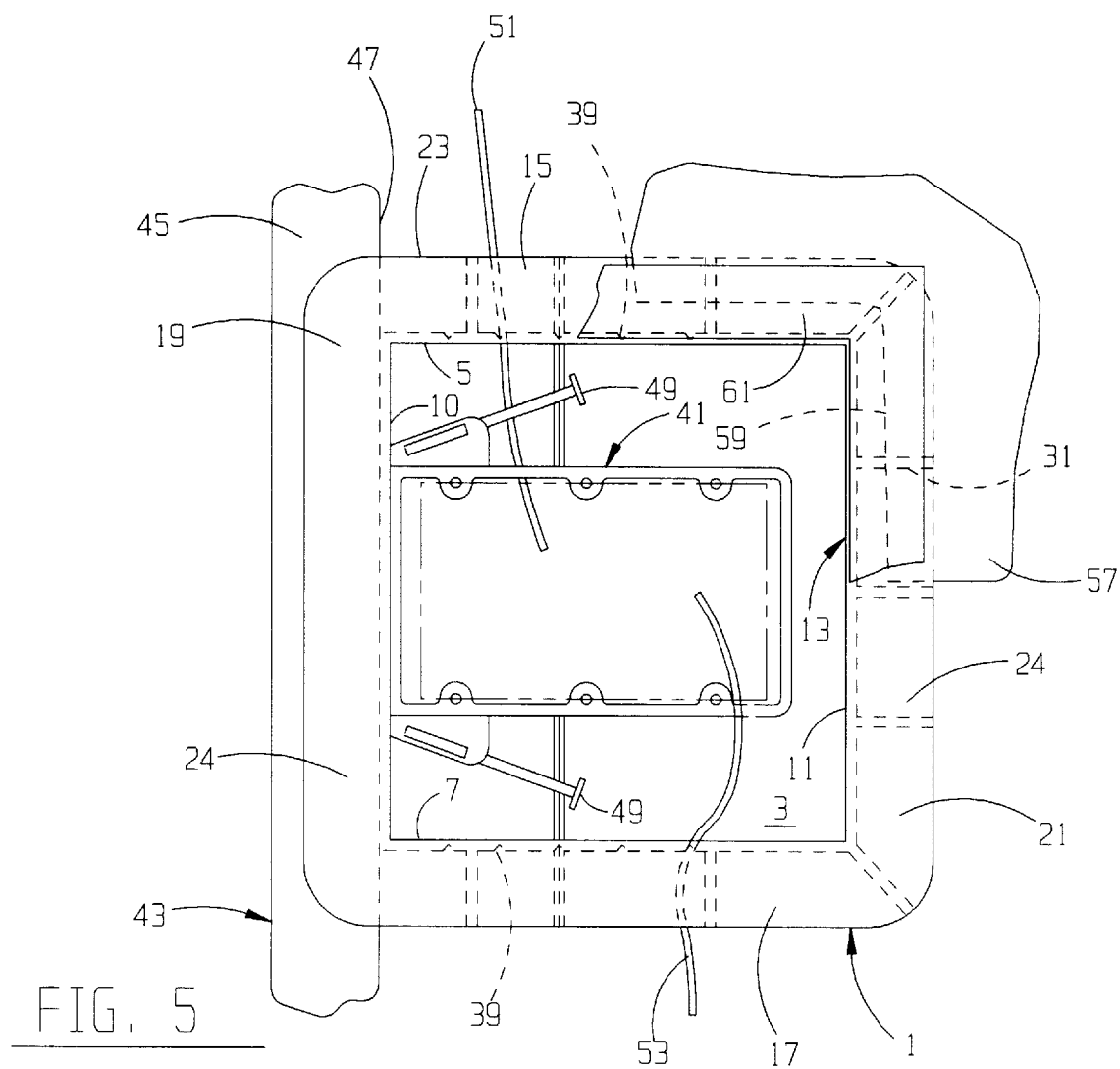
FIG. 5 is a front view of the invention shown in use with a first typical electrical outlet box mounted to a side wall of a building.
Figure 7:
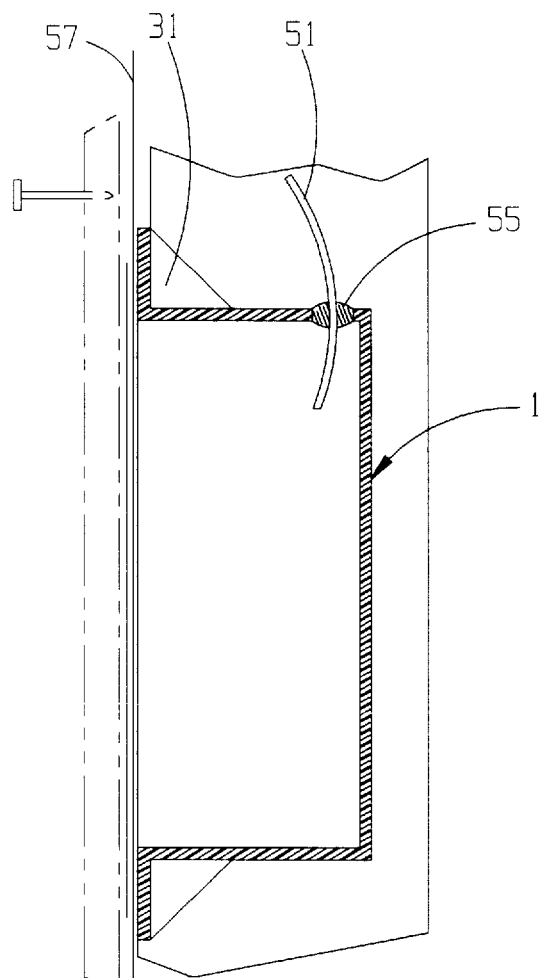
FIG. 7 is a cross sectional view taken along line 7—7 of FIG. 6.

Now looking at FIGS. 5–7, the universal air-vapor barrier box 1 is shown in use with a conventional electrical outlet box 41 that is mounted to a stud 43 of a building side wall. The back surface 20 of the barrier box flange 19 is placed against one face 45 of the stud 43. The outside surface of the barrier box first side wall 9 is placed against a second face 47 of the stud. The electrical outlet box 41 is placed against the inside surface 10 of the barrier box first side wall. Nails 49 are driven with a hammer through the barrier box first side wall and into the stud face 47, thereby mounting both the barrier box and the electrical outlet box simultaneously to the stud.

An electrician uses a knife to slit through the top and bottom walls 5 and 7 along the short grooves 39 that are most convenient to suit the wiring job at hand. For example, in FIGS. 5–7, one each of the short grooves 39 on the top wall and bottom wall are slit through to pass wires 51 and 53, respectively.

After the wiring is completed, the spaces around the wires, such as wire 51, within the slit grooves 39 are filled with caulk 55, FIG. 7. When it is time to close the building wall, a sheet of moisture impervious film 57 is laid over the wall. A rectangular opening 59 is cut in the film 57, FIG. 5. The opening 59 has a size a little larger than the size of the container section 13 of the universal air-vapor barrier box 1. Strips of pressure sensitive tape 61 hold the film to the front surface 24 of the barrier box flanges 15, 17, 19, and 21. In that manner, air leakage through and around the electrical outlet box 41 is prevented. Dry wall 62 is later nailed to the building wall in a well known manner.

Figure 10:
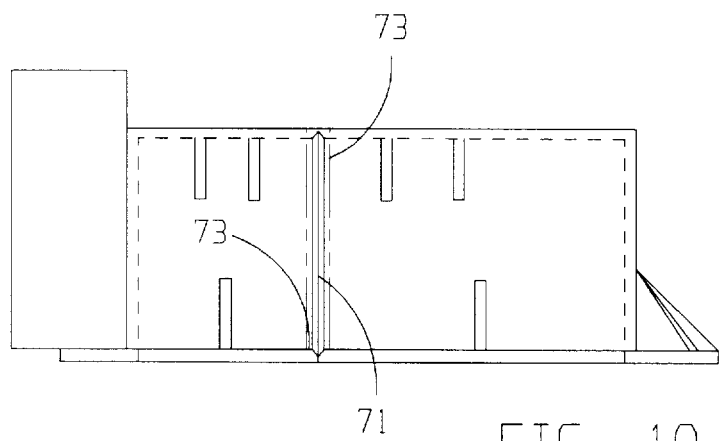
FIG. 10 is a view generally similar to FIG. 9, but showing the universal air-vapor barrier box bent back to the configuration of the fixed mode.
Figure 9:
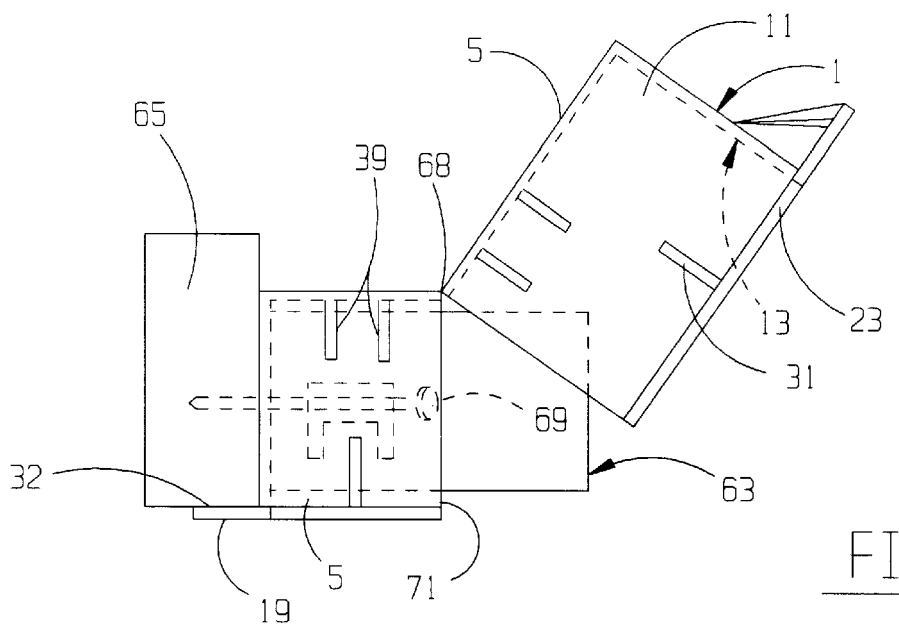
FIG. 9 is a view taken along line 9—9 of FIG. 8 showing the universal air-vapor barrier box in the foldable mode.
Figure 8:
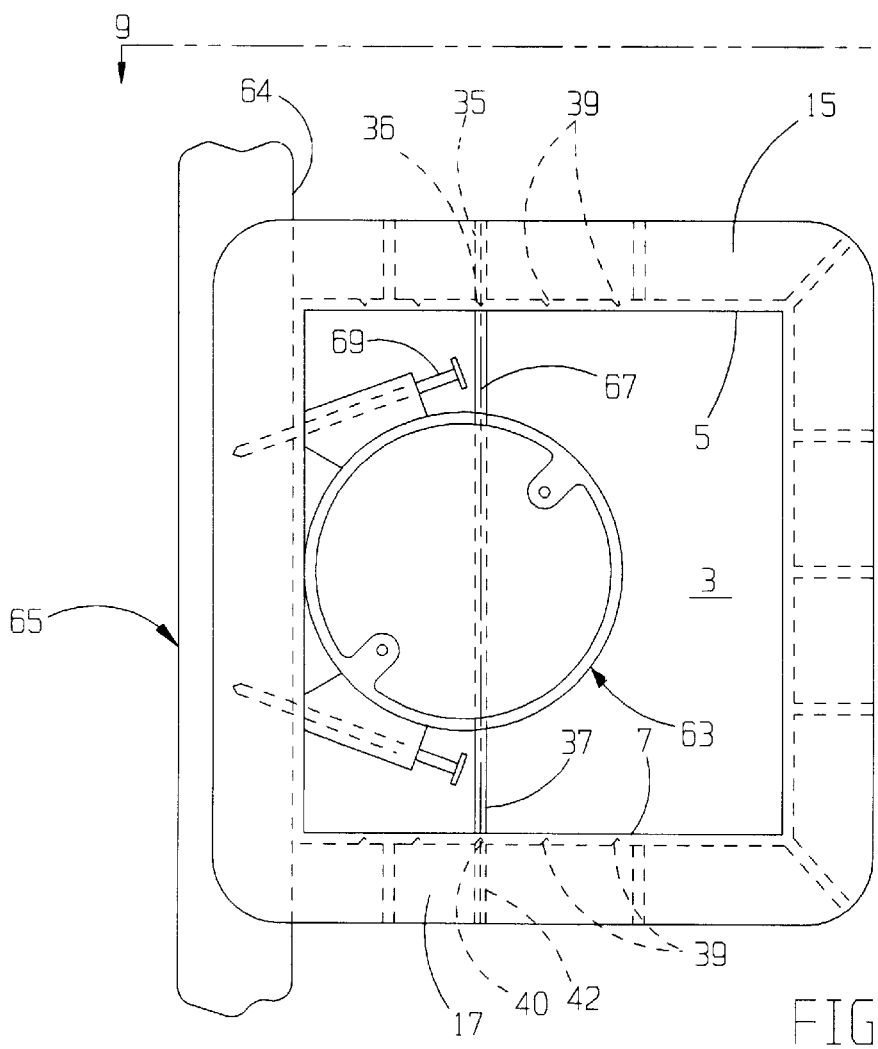
FIG. 8 is a bottom view of a second typical electrical outlet box mounted to a ceiling rafter of a building with the universal air-vapor barrier box.

FIGS. 5–7 show the universal air-vapor barrier box 1 in use when in a fixed mode. That is, the barrier box is not altered from its manufactured construction of FIGS. 1–4, in which each of the top and bottom walls 5 and 7, respectively, and each of the top and bottom flanges 15 and 17, respectively, is a unitary member. Turning to FIGS. 8–10, usage of the universal air-vapor barrier box 1 when in a foldable mode will be described. In FIGS. 8 and 9, reference numeral 63 represents a conventional ceiling electrical outlet box that is to be mounted to the side surface 64 of a rafter 65. As is known to those in the industry, electrical outlet boxes for ceilings require considerably more space for installing than electrical outlet boxes for side walls (reference numeral 41 of FIGS. 5 and 6). Accordingly, electricians experience difficulty in mounting the ceiling electrical outlet box 63 to the rafter 65 if the barrier box is left in the fixed mode of FIGS. 1–7.

To enable the universal air-vapor barrier box 1 to be used conveniently with a ceiling electrical outlet box 63, the electrician cuts the barrier box flanges 15 and 17 through the grooves 35 and 42, respectively. The electrician also cuts through the groove 36 in the top wall 5 and through the groove 40 in the bottom wall 7. The groove 37 in the back wall 3 remains uncut. However, the back wall then becomes capable of bending about a fold line 67 located within the material 68 adjacent the root 44 of the groove 37 (FIG. 4). The material 68 thus defines the fold line 67, and the material 68 acts as a living hinge that enables the barrier box to be converted into the foldable mode, FIG. 9. When the barrier box is in the foldable mode, the container section 13 can be opened up to provide plenty of room for swinging a hammer to drive the nails 69 and mount the ceiling electrical outlet box 63 to the rafter 65. Although not shown in FIGS. 8 and 9, any of the grooves 39 in the top and/or bottom walls can be slit through for passage of wires in the same manner as shown in FIGS. 5–7.

Before the ceiling is closed, the universal air-vapor barrier box 1 is bent back to the configuration of the fixed mode of FIGS. 1–7. See FIG. 10. The surfaces 71 created in the grooves 35, 36, 40, and 42 when the grooves were cut come together and abut in a joint when the barrier box is bent back to the configuration of the fixed mode. A strip of tape 73 is placed over each of the joints at the cut grooves. A suitable tape 73 is contractor's sheathing tape manufactured by the Minnesota Mining & Manufacturing Company. After applying a moisture impervious film to the ceiling in the same manner as to the side walls as previously described in conjunction with FIGS. 5–7, no air leakage is possible past the ceiling electrical outlet box 63 or the barrier box.

Figure 12:
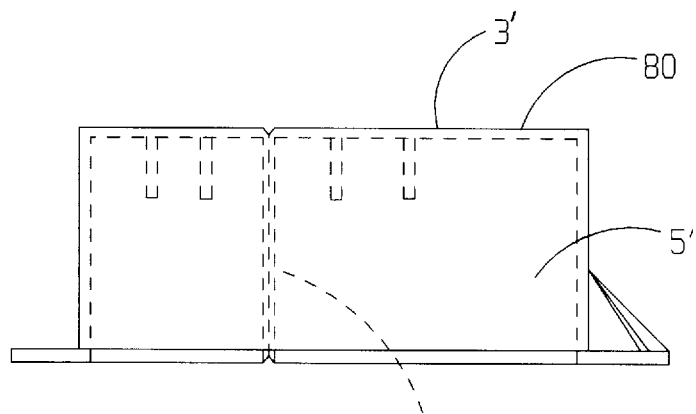
FIG. 12 is a top view of FIG. 11.
Figure 11:
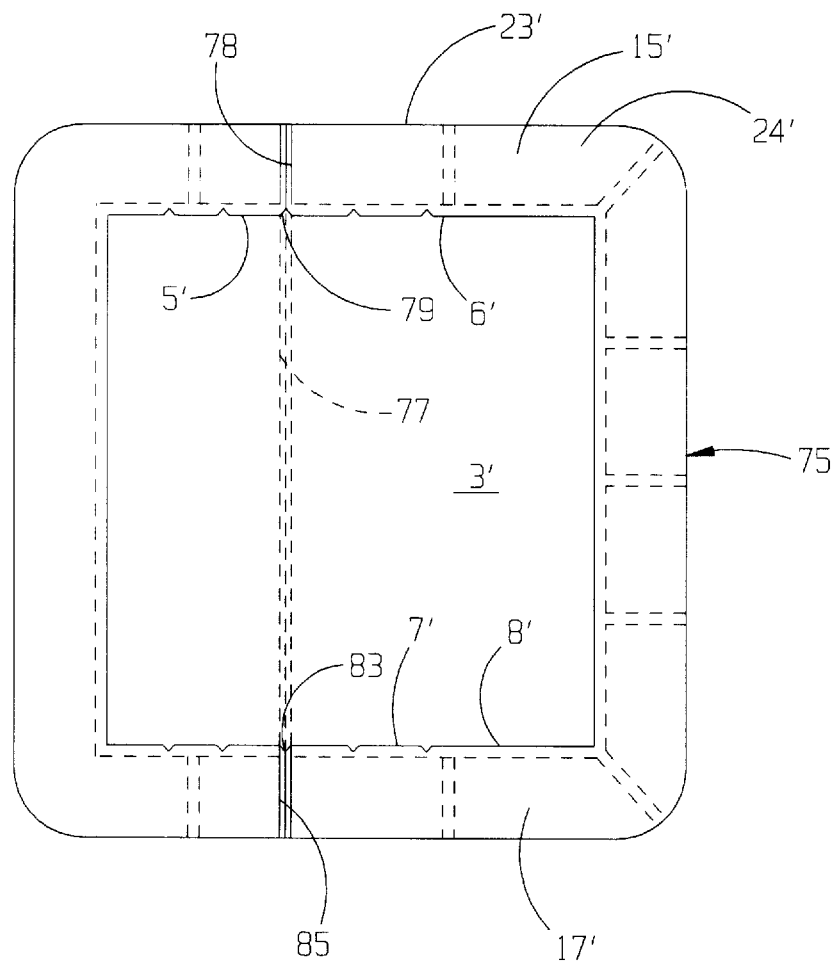
FIG. 11 is a front view of a modified embodiment of the invention.

FIGS. 11 and 12 show a modified embodiment of the invention. The universal air-vapor barrier box 75 of FIGS. 11 and 12 is generally similar to the barrier box 1 described above in conjunction with FIGS. 1–10. That is, the barrier box 75 has a back wall 3', top wall 5', bottom wall 7', top flange 15', and bottom flange 17'. A groove 78 extends from the free edge 23' of the top flange 15' along the flange front surface 24' to the top wall 5'. A groove 79 continues from the groove 78 along the inside surface 6' of the top wall 5' to the back wall 3'. A groove 77 is aligned with the groove 79, but the groove 77 is along the outside surface 80 of the back wall 3'. Grooves 83 and 85 are aligned with each other and with the groove 77. The groove 83 is along the inside surface 8' of the bottom wall 7'. The groove 85 is in the front surface 24' of the bottom flange 17'. The function and use of the barrier box 75 is identical to that of the barrier box 1.

In summary, the results and advantages of air-vapor barrier boxes used in low energy buildings can now be more fully realized. The universal air-vapor barrier boxes 1 and 75 provide both high energy efficiency and a single product that accommodates a wide range of electrical outlet box sizes and shapes. This desirable result comes from using the grooves in the top and bottom flanges and top, bottom, and back walls. In applications in which the barrier box container section has sufficient size to enable an electrician to swing a hammer and thereby mount the barrier box and electrical outlet box to a building wall without problem, the barrier box is used in the fixed mode as manufactured. In applications in which the barrier box container section is too small to permit easy mounting of the electrical outlet box and the barrier box when the barrier box is in the fixed mode, the electrician merely cuts through the grooves in the top and bottom flanges and top and bottom walls. The barrier box is then in a foldable mode. The material adjacent the groove in the back wall acts as a living hinge that enables the barrier box to bend back and provide ample room for swinging a hammer and mounting even large and unusually shaped electrical outlet boxes. After the barrier box and electrical outlet box are mounted, the barrier box is bent back to the configuration of the fixed mode. The joints at the cut grooves are sealed to preserve the integrity of the air-tight nature of the building wall.

It will also be recognized that in addition to the superior performance of the universal air-vapor barrier box, its cost is very modest in relation to the benefits it provides. The fact that a contractor needs to inventory just one barrier box, which can accommodate all commonly used electrical outlet boxes, is a major benefit of the invention.

Thus, it is apparent that there has been provided, in accordance with the invention, a universal air-vapor barrier box that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A universal air-vapor barrier box comprising:
   a. opposed top and bottom walls, opposed first and second side walls, and a back wall that cooperate to define a container section having a size sufficient to receive a selected electrical outlet box, the back wall being formed with a shallow groove that extends between the top and bottom walls, the top and bottom walls being formed with respective shallow grooves that are aligned with the groove in the back wall; and
   b. top and bottom flanges projecting outwardly from the top and bottom walls, respectively, and first and second side flanges projecting outwardly from the first and second side walls, respectively, the top, bottom, and first and second side flanges having respective free edges and coplanar front surfaces, the top and bottom flanges being formed with respective shallow grooves that are aligned with and extend from the grooves in the top and bottom walls to the free edges of the top and bottom flanges, the grooves in the top and bottom walls and top and bottom flanges being selectively cutable therethrough to enable the universal air-vapor barrier box to bend along the back wall adjacent the groove therein.

2. The universal air-vapor barrier box of claim 1 wherein:
   a. the back, top, and bottom walls have respective inside and outside surfaces;
   b. the top and bottom flanges have respective front and back surfaces;
   c. the grooves in the top and bottom walls are on the respective outside surfaces thereof;
   d. the grooves in the top and bottom flanges are in the respective back surfaces thereof; and
   e. the groove in the back wall is in the inside surface thereof.

3. The universal air-vapor barrier box of claim 1 wherein:
   a. the thickness of the top, bottom, and back walls and of the top and bottom flanges is approximately 0.07 inches; and
   b. the grooves in the top and bottom walls and in the top and bottom flanges are generally V-shaped and are approximately 0.02 inches to 0.03 inches wide and approximately 0.010 inches to 0.015 inches deep.

4. The universal air-vapor barrier box of claim 1 wherein the groove in the back wall is generally V-shaped having a width of approximately 0.12 inches to 0.15 inches, and a depth of approximately 0.040 inches to 0.055 inches and has a flat root that is approximately 0.01 inches wide.

5. The universal air-vapor barrier box of claim 1 wherein:
a. the back, top, and bottom walls have respective inside and outside surfaces;
b. the grooves in the top and bottom walls are on the respective inside surfaces thereof;
c. the grooves in the top and bottom flanges are in the respective front surfaces thereof; and
d. the groove in the back wall is in the outside surface thereof.

6. Apparatus for preventing air and moisture from flowing past an electrical outlet box in a building wall comprising:
a. a universal air-vapor barrier box comprising:
   i. a container section having an area and depth large enough to surround a selected electrical outlet box on five sides and defined by top, bottom, back, and opposed first and second side walls, the back, top, and bottom walls having respective aligned grooves therein, the groove in the back wall extending between the top and bottom walls; and
   ii. top, bottom, and side flanges projecting outwardly from the top, bottom, and side walls, respectively, each flange having front and back surfaces, the flange front surfaces being coplanar, the top and bottom flanges having respective free edges and respective grooves that extend from the free edges and continue into the grooves in the top and bottom walls, each of the top and bottom walls and top and bottom flanges being a respective unitary member to thereby place the universal air-vapor barrier box in a fixed mode, the electrical outlet box being mounted to a wall of the building with the container section first side wall being between the electrical outlet box and the building wall;
b. film means for covering the building wall and having an opening slightly larger than the area of the universal air-vapor barrier box container section; and
c. tape means for sealing the film means around the opening thereof to the flanges of the universal air-vapor barrier box.

7. The apparatus of claim 6 wherein:
a. the thickness of the top, bottom, and back walls and of the top and bottom flanges is approximately 0.07 inches; and
b. the grooves in the top and bottom walls and in the top and bottom flanges are generally V-shaped and are approximately 0.02 inches to 0.03 inches wide and approximately 0.010 inches to 0.015 inches deep.

8. The apparatus of claim 7 wherein:
a. the back, top, and bottom walls have respective inside and outside surfaces;
b. the grooves in the top and bottom walls are on the respective outside surfaces thereof;
c. the grooves in the top and bottom flanges are in the respective back surfaces thereof; and
d. the groove in the back wall is in the inside surface thereof.

9. The apparatus of claim 7 wherein:
a. the back, top, and bottom walls have respective inside and outside surfaces;
b. the grooves in the top and bottom walls are on the respective inside surfaces thereof;
c. the grooves in the top and bottom flanges are in the respective front surfaces thereof; and d. the groove in the back wall is in the outside surface thereof.

10. The apparatus of claim 6 wherein at least one of the top and bottom walls has at least one groove therein that extends from the back wall toward the associated flange for approximately one inch, the groove having a generally V-shape with a width of approximately 0.02 inches to 0.03 inches, and a depth of approximately 0.10 inches to .015 inches.

11. In combination with a ceiling electrical outlet box mounted to a rafter, a universal air-vapor barrier box for preventing air flow through the electrical outlet box comprising:
a. a container section defined by top, bottom, back, and first and second side walls, the back wall having a groove therein between the top and bottom walls, the top and bottom walls having respective grooves that are aligned with the groove in the back wall, the electrical outlet box being received in the container section and mounted to the rafter with a side wall of the universal air-vapor barrier box interposed between the electrical outlet box and the rafter; and
b. top, bottom and side flanges having respective front and back surfaces and projecting outwardly from the respective top, bottom, and side walls and having respective free edges, the top and bottom flanges having respective grooves that are aligned with the grooves in the top and bottom walls and extend between the respective free edges of the flanges and the grooves in the top and bottom walls, the grooves in the top and bottom flanges and the top and bottom walls being cut through to thereby enable the back wall to bend about the groove therein and thereby open up the container section,
   so that increased space is available for mounting the ceiling electrical outlet box to the rafter when the universal air-vapor barrier box is bent back to open up the container section.

12. The combination of claim 11 wherein:
a. the back, top, and bottom walls have respective inside and outside surfaces;
b. the grooves in the top and bottom walls are on the respective outside surfaces thereof;
c. the grooves in the top and bottom flanges are in the respective back surfaces thereof; and
d. the groove in the back wall is in the inside surface thereof.

13. The combination of claim 11 wherein:
a. the thickness of the top, bottom, and back walls and of the top and bottom flanges is approximately 0.07 inches;
b. the grooves in the top and bottom walls and in the top and bottom flanges are generally V-shaped and are approximately 0.02 inches to 0.03 inches wide and approximately 0.010 inches to 0.015 inches deep; and
c. the groove in the back wall is generally V-shaped having a width of approximately 0.12 inches to 0.15 inches and a depth of approximately 0.04 inches to 0.055 inches and having a flat root approximately 0.01 inches wide.

14. The combination of claim 11 wherein:
a. the back, top, and bottom walls have respective inside and outside surfaces;
b. the grooves in the top and bottom walls are on the respective inside surfaces thereof;

c. the grooves in the top and bottom flanges are in the respective front surfaces thereof; and d. the groove in the back wall is in the outside surface thereof.

15. A universal air-vapor barrier box that is convertible between fixed and foldable modes for use with first and second electrical outlet boxes, respectively, comprising top, bottom, back, and side walls that cooperate to define a container section having a size sufficient to receive a selected one of the first and second electrical outlet boxes, and top, bottom, and side flanges that project outwardly from the top, bottom, and side walls, respectively, and that terminate in respective free edges, each of the top, bottom, and side flanges having a respective front surface and back surface, there being a groove in the back wall between the top and bottom walls, a groove in each of the top and bottom walls aligned with the groove in the back wall, and a groove in each of the top and bottom flanges aligned with and continuous with the grooves in the top and bottom walls, respectively, and extending to the free edges of the respective top and bottom flanges, the universal air-vapor barrier box being in the fixed mode when the top and bottom flanges and top and bottom walls are uncut such that each of the top and bottom flanges and top and bottom walls is a unitary member, the universal air-vapor barrier box being convertible to the foldable mode by cutting through the grooves in the top and bottom walls and top and bottom flanges to thereby enable the back wall to bend about the groove therein to open up the container section and thereby provide increased space around the electrical outlet box.

16. The universal air-vapor barrier box of claim 15 wherein:

a. the back, top, and bottom walls have respective inside and outside surfaces;

b. the grooves in the top and bottom walls are on the respective outside surfaces thereof;

c. the grooves in the top and bottom flanges are in the respective back surfaces thereof; and d. the groove in the back wall is in the inside surface thereof.

17. The universal air-vapor barrier box of claim 15 wherein:

a. the thickness of the top, bottom, and back walls and of the top and bottom flanges is approximately 0.07 inches;

b. the grooves in the top and bottom walls and in the top and bottom flanges are generally V-shaped and are approximately 0.02 inches to 0.03 inches wide and approximately 0.010 inches to 0.015 inches deep; and c. the groove in the back wall is generally V-shaped having a width of approximately 0.12 inches to 0.15 inches and a depth of approximately 0.04 inches to 0.055 inches and having a flat root approximately 0.01 inches wide.

18. The universal air-vapor barrier box of claim 15 wherein:

a. the back, top, and bottom walls have respective inside and outside surfaces;

b. the grooves in the top and bottom walls are on the respective inside surfaces thereof;

c. the grooves in the top and bottom flanges are in the respective front surfaces thereof; and d. the groove in the back wall is in the outside surface thereof.

19. A method of preventing air flow through and around an electrical outlet box mounted in a building comprising the steps of:

a. providing a universal air-vapor barrier box having bottom, top, back, and first and second side walls that define a container section, and top and bottom flanges that project outwardly from the top and bottom walls, respectively, there being a groove in the back wall extending between the top and bottom walls, and grooves in the top wall and top flange that are continuous with each other and are aligned with the groove in the ba k wall, and grooves in the bottom wall and bottom flange that are continuous with each other and are aligned with the groove in the back wall;

b. cutting through the grooves in the air-vapor barrier box top and bottom walls and top and bottom flanges;

c. bending the back wall and thereby opening up the container section;

d. mounting the electrical outlet box to a selected member of the building with the universal air-vapor barrier box firs wall between the electrical outlet box and the selected member of the building; and e. bending the back wall of the universal air-vapor barrier box such that the flanges thereof are coplanar; and f. taping the cuts in the top and bottom walls and top and bottom flanges.

20. A method of converting an air-vapor barrier box from a fixed mode to a foldable mode comprising the steps of:

a. manufacturing the air-vapor barrier box with unitary top, bottom, back, and side walls that define a container section of a predetermined area and depth, and with unitary flanges projecting outwardly from the top, bottom, and side walls, there being a first groove in the back wall that extends between the top and bottom walls, second and third grooves in the top and bottom walls, respectively, that are aligned with the first groove and that extend from the back wall to the associated flange, and fourth and fifth grooves in the respective flanges that project from the top and bottom walls such that the air-vapor barrier box is in the fixed mode upon manufacturer thereof; and b. cutting through the second, third, fourth, and fifth grooves and thereby enabling the back wall to bend about the first groove such that the air-vapor barrier box is in the foldable mode.

* * * * *